(12) United States Patent
Satterthwaite et al.

(10) Patent No.: US 10,350,835 B2
(45) Date of Patent: Jul. 16, 2019

(54) BICYCLE WHEEL HUB WITH MOLDED SPOKE HOLES

(71) Applicant: ENVE Composites, LLC, Ogden, UT (US)

(72) Inventors: Brett Satterthwaite, Ogden, UT (US); Carl Jacob Turner, Syracuse, UT (US)

(73) Assignee: ENVE Composites, LLC, Ogden (*) Notice: Subject to any disclaimer, the term of this patent is extended or adjusted under 35 U.S.C. 154(b) by 169 days.

(21) Appl. No.: 15/437,900

(22) Filed: Feb. 21, 2017

(65) Prior Publication Data
US 2017/0157864 A1     Jun. 8, 2017

Related U.S. Application Data

(62) Division of application No. 14/317,006, filed on Jun. 27, 2014, now Pat. No. 9,610,802.

(51) Int. Cl.
*B29C 70/06*     (2006.01)
*B29C 70/30*     (2006.01)
(Continued)

(52) U.S. Cl.
CPC .............. *B29C 70/30* (2013.01); *B29C 70/06* (2013.01); *B29C 70/28* (2013.01); *B29C 70/541* (2013.01); *B29C 70/543* (2013.01); *B60B 5/02* (2013.01); *B60B 27/0015* (2013.01); *B60B 27/023* (2013.01); *B29C 70/56* (2013.01); *B29K 2307/04* (2013.01); *B29K 2313/00* (2013.01); *B29L 2031/16* (2013.01); *B29L 2031/3091* (2013.01); *B29L 2031/32* (2013.01); *B60B 1/041* (2013.01); *B60B 27/047* (2013.01);
(Continued)

(58) Field of Classification Search
CPC ..................................................... B29C 70/06
See application file for complete search history.

(56) References Cited

U.S. PATENT DOCUMENTS 3,765,980 A * 10/1973 Hurlbut, Sr. .......... B29C 53/587
                                                               156/173
3,865,220 A    2/1975 Thompson, Jr. et al.
(Continued)

FOREIGN PATENT DOCUMENTS

DE    10 2010 008 319 A1    8/2011
EP         0 165 567 A2    12/1985
(Continued)

OTHER PUBLICATIONS

Machine Translation of Japanese Patent 5-209625, Date Unknown.*
(Continued)

*Primary Examiner* — Jeffry H Aftergut
(74) *Attorney, Agent, or Firm* — Woodard, Emhardt, Henry, Reeves & Wagner, LLP

(57) ABSTRACT

A hub for a bicycle wheel includes a hub shell that defines one or more spoke holes. The hub shell includes a fiber reinforced material. The fiber reinforced material has one or more reinforcement fibers bending around the spoke holes to remain continuous around the spoke holes. One or more flanges with the spoke holes extend from the hub shell at an outer radial direction. A clutch or freehub adapter is coupled to the hub shell. Depending on the type of clutch mechanism used in the freehub, different clutch adapters can be incorporated into the hub.

35 Claims, 13 Drawing Sheets

(51) Int. Cl.
    B60B 27/02    (2006.01)
    B60B 27/00    (2006.01)
    B29C 70/28    (2006.01)
    B60B 5/02     (2006.01)
    B29C 70/54    (2006.01)
    B29L 31/16        (2006.01)
    B29L 31/32        (2006.01)
    B60B 27/04        (2006.01)
    B29K 307/04       (2006.01)
    B29L 31/30        (2006.01)
    B60B 1/04         (2006.01)
    B29C 70/56        (2006.01)

(52) U.S. Cl.
    CPC ... *B60B 2310/204* (2013.01); *B60B 2310/211* (2013.01); *B60B 2310/241* (2013.01); *B60B 2360/341* (2013.01); *B60B 2360/344* (2013.01); *B60B 2360/3416* (2013.01); *B60B 2360/3444* (2013.01); *B60B 2900/111* (2013.01); *B60B 2900/212* (2013.01); *B60B 2900/311* (2013.01); *B60Y 2200/13* (2013.01)

(56) References Cited

U.S. PATENT DOCUMENTS

| | | | |
|---|---|---|---|
| 4,300,804 A | 11/1981 | Hasebe | |
| 4,595,242 A | 6/1986 | Wehmeyer | |
| 4,622,731 A | 11/1986 | Kjell | |
| 4,844,552 A | 7/1989 | Tsygankov et al. | |
| 5,829,844 A | 11/1998 | Slankard et al. | |
| 5,947,565 A | 9/1999 | Dietrich | |
| 5,964,332 A | 10/1999 | King | |
| 6,568,767 B2 | 5/2003 | Meggiolan | |
| 6,688,704 B2 | 2/2004 | Meggiolan | |
| 7,273,258 B2 | 9/2007 | Meggiolan | |
| 7,357,459 B2 | 4/2008 | Schlanger | |
| 7,481,499 B2 * | 1/2009 | Meggiolan | B60B 1/041 192/64 |
| 7,484,812 B2 | 2/2009 | Meggiolan | |
| 7,562,755 B2 | 7/2009 | Spahr | |
| 7,562,940 B2 | 7/2009 | D'Aluisio | |
| 7,658,450 B2 | 2/2010 | Mercat et al. | |
| 7,926,884 B2 | 4/2011 | Heyse | |
| 8,313,155 B2 | 11/2012 | Schiers | |
| 8,757,341 B2 | 6/2014 | Klieber | |
| 8,985,708 B2 | 3/2015 | Connolly | |
| 9,290,042 B2 | 3/2016 | Miyamoto | |
| 9,346,319 B2 | 5/2016 | Schiers | |
| 9,428,006 B2 | 6/2016 | Marlin et al. | |
| 9,393,832 B2 | 7/2016 | Debien | |
| 9,415,628 B2 | 8/2016 | Kia et al. | |
| 9,428,005 B2 | 8/2016 | Fabris et al. | |
| 9,475,341 B2 | 10/2016 | Hufenbach et al. | |
| 9,505,261 B2 | 11/2016 | Connolly | |
| 2002/0043873 A1 | 4/2002 | Meggiolan | |
| 2006/0145530 A1 | 7/2006 | Damon | |
| 2010/0090518 A1 * | 4/2010 | Schiers | B29C 70/342 301/55 |
| 2014/0060992 A1 | 3/2014 | Spahr et al. | |

FOREIGN PATENT DOCUMENTS

| | | |
|---|---|---|
| EP | 2 586 625 A1 | 5/2013 |
| EP | 2 653 294 A1 | 10/2013 |
| EP | 2 703 679 A1 | 3/2014 |
| JP | 5-209625 A * | 8/1993 |
| JP | 5-269868 A * | 10/1993 |
| WO | WO 2004/108512 A2 | 12/2004 |

OTHER PUBLICATIONS

Machine Translation of Japanese Patent 5-269868, Date Unknown.*
European Patent Application 15165778.0 Extended Search Report dated Nov. 5, 2015.

* cited by examiner

BICYCLE WHEEL HUB WITH MOLDED SPOKE HOLES

CROSS-REFERENCE TO RELATED APPLICATION

This application is a divisional of U.S. application Ser. No. 14/317,006, filed Jun. 27, 2014, which is hereby incorporated by reference.

BACKGROUND

In the bicycle industry, there is always a need to produce strong but lightweight components. Any weight reductions of the bicycle lower the amount of energy expended by the bicyclist. Even small reductions in weight can be all the difference between winning and losing. Modern composite materials, such as carbon fiber materials, have been widely used on a variety of components of bicycles due to their high strength and low weight properties. However, carbon fiber materials still have a number of drawbacks that make them undesirable for certain components in bicycles. For instance, carbon fiber is relatively weak under compressive loads and can delaminate under repeated stress commonly experienced in wheel hubs. Moreover, minor fractures can grow and propagate so as to lead to catastrophic failure of carbon fiber components. Typically, since the wheel hub experiences significant mechanical stress, the wheel hub for bicycle wheels is made of a light metal alloy, such as an aluminum alloy, to avoid any catastrophic failures associated with carbon fiber materials. Nevertheless, wheel hubs made of carbon fiber materials have been proposed, such as in U.S. Pat. No. 7,484,812 to Meggiolan and US Patent Application Publication Number US 2006/0145530 A1 to Damon, but these designs typically still have a number of significant drawbacks. For instance, these designs require specialized structures for attaching the spokes which in turn can make spoke replacement difficult as well as can impact ride quality. Moreover, these designs also fail to account for the dramatic torques experienced between the wheel hub and the freehub mechanism. As such, these wheel hub designs can be prone to premature catastrophic failure and are difficult to retrofit to existing cartridge designs.

Thus, there is a need for improvement in this field.

SUMMARY

The wheel hub as described and illustrated herein is made of fiber reinforced material. The wheel hub has one or more flanges that extend from the hub body. The flanges allow traditional spokes to be attached to the wheel hub. Moreover, the flanges facilitate the ability to adjust the stiffness of the wheel so as to provide a more comfortable or high performance ride. To allow the use of a flange, the wheel hub incorporates a composite material in which a tow of reinforcing fibers are woven around the spoke holes in which the spokes are received. By weaving the reinforcing fibers around the spoke holes, rather than machining the spoke holes, the flange is able to provide sufficient strength against the significant forces applied by the spoke. In other words, by having the strands intact by weaving them around the spoke holes, the holes can better resist tearing. In contrast, machining the spoke hole openings tends to weaken the overall structure.

The wheel hub is designed to be used in conjunction with a variety of clutch or ratcheting mechanisms. In one example, the wheel hub body is completely made from the fiber reinforced material. One concern with making the wheel hub body completely from fiber reinforced materials is related to the long-term strength of the ratchet teeth that are engaged by pawls on the freehub. Over time, the teeth can chip, wear, or even break. To address this, the fiber reinforced material is oriented or woven in a particular pattern and directed within the teeth to provide additional strength.

In other examples, a composite approach is used in which a portion of the wheel hub body is made of fiber reinforced materials and other portions are made of metal or other materials. For instance, the races against which the bearings ride can be made of metal, while other components are made of composite materials. In still yet another example, an insert or clutch adapter adapts the wheel hub for use with a clutch. The clutch adapter can be changed to allow the wheel hub to be used with various differing clutch designs.

The wheel hub design as described and illustrated herein concerns a number of unique and inventive aspects. Some, but by no means all, of these unique aspects are summarized below.

Aspect 1 concerns an apparatus including a hub for a bicycle wheel. The hub includes a hub shell that defines one or more spoke holes. The hub shell includes a fiber reinforced material. The fiber reinforced material has one or more reinforcement fibers bending around the spoke holes to remain continuous around the spoke holes.

Aspect 2 concerns the apparatus of any preceding aspect, wherein the hub is configured to rotate about a rotational axis. The hub has one or more spoke flanges extending from the hub shell at a direction transverse to the rotational axis. The fiber reinforced material extends to form at least part of the spoke flanges. The spoke holes are defined in the spoke flanges.

Aspect 3 concerns an apparatus including a hub for a bicycle wheel. The hub includes a hub shell composed of a fiber reinforced material. One or more flanges extend from the hub shell at an outer radial direction. The spoke flanges have one or more spoke holes. The fiber reinforced material extends from the hub shell to the flanges.

Aspect 4 concerns the apparatus of any preceding aspect, wherein the spoke holes extend completely through to opposing sides of the flange.

Aspect 5 concerns the apparatus of any preceding aspect, wherein the spoke holes include countersink sections.

Aspect 6 concerns the apparatus of any preceding aspect, wherein the hub shell includes one or more tows of the fiber reinforced material bent around the spoke holes.

Aspect 7 concerns the apparatus of aspect 6, wherein the tows are woven between the spoke holes.

Aspect 8 concerns the apparatus of any one of aspects 6 or 7, wherein the tows form a basket weave type pattern around the spoke holes.

Aspect 9 concerns the apparatus of any one of aspects 6, 7, or 8, wherein the tows are covered by an outer covering ply made of the fiber reinforced material.

Aspect 10 concerns the apparatus of any one of aspects 6, 7, 8, or 9, wherein the tows include rolled tows or other local reinforcements.

Aspect 11 concerns the apparatus of any preceding aspect, wherein the hub includes a clutch engagement structure configured to engage a clutch.

Aspect 12 concerns the apparatus of aspect 11, wherein the clutch engagement structure is integral to the hub shell.

Aspect 13 concerns the apparatus of aspect 11, wherein the hub includes a clutch adapter coupled to the hub shell and the clutch adapter has the clutch engagement structure.

Aspect 14 concerns an apparatus including a hub for a bicycle wheel. The hub includes a hub shell formed from a fiber reinforced material. The hub shell defines an adapter engagement opening. The clutch adapter is received in the adapter engagement opening. The clutch adapter includes a clutch engagement structure configured to engage a clutch of a freehub.

Aspect 15 concerns the apparatus of any one of aspects 11-14, wherein the clutch engagement structure includes one or more splines configured to engage a clutch plate.

Aspect 16 concerns the apparatus of any one of aspects 13-15, wherein the hub includes an anti-rotation structure that inhibits rotation of the clutch adapter relative to the hub shell.

Aspect 17 concerns the apparatus of aspect 16, wherein the anti-rotation structure includes one or more teeth on the clutch adapter biting into one or more teeth on the hub shell.

Aspect 18 concerns the apparatus of aspect 16, wherein the teeth of the hub shell are made by one or more plies of the fiber reinforced material folded in the shape of the teeth of the hub shell.

Aspect 19 concerns the apparatus of any one of aspects 13-18, wherein the clutch adapter is made of a metal.

Aspect 20 concerns the apparatus of any preceding aspect, wherein the fiber reinforced material is a carbon fiber material.

Aspect 21 concerns the apparatus of any preceding aspect, further including a freehub coupled to the hub.

Aspect 22 concerns the apparatus of any preceding aspect, further including the bicycle wheel. The bicycle wheel includes the wheel hub, a bicycle rim surrounding the wheel hub, and one or more spokes coupled to the spoke holes of the bicycle wheel hub. The spokes connect the wheel hub to the bicycle rim.

Aspect 23 concerns the apparatus of aspect 22, further including a bicycle attached to the bicycle wheel.

Aspect 24 concerns a method of manufacturing an apparatus of any preceding aspect.

Aspect 25 concerns a method, including forming one or more spoke holes by bending one or more reinforcement fibers of a fiber reinforced material around one or more spoke pins where the reinforcement fibers remain continuous around the spoke holes. The fiber reinforced material is molded into the shape of a hub shell with the spoke holes.

Aspect 26 concerns the method of any one of aspects 24-25, wherein the forming the spoke holes includes weaving one or more tows of the fiber reinforced material around the spoke pins. The tows are covered with an outer covering made of one or more plies of the fiber reinforced material.

Aspect 27 concerns the method of any one of aspects 24-26, further including forming one or more flanges of the hub shell with the fiber reinforced material.

Aspect 28 concerns the method of any one of aspects 24-27, further including applying the fiber reinforced material around a clutch adapter before the molding.

Aspect 29 concerns the method of aspect 28, further including creating an anti-rotation structure to inhibit rotation of the clutch adapter relative to the hub shell by folding plies of the fiber reinforced material to engage teeth of the clutch adapter.

Aspect 30 concerns the method of any one of aspects 24-29, further including positioning one or more plies of the fiber reinforced material to form a clutch engagement structure that is integrally formed in the hub shell.

Aspect 31 concerns the method of any one of aspects 24-30, wherein the molding includes curing the fiber reinforced material by applying heat and pressure to a mold.

Aspect 32 concerns the apparatus or method of any preceding aspect, wherein the reinforcement fibers immediately adjacent to the spoke holes curve around the periphery of the spoke holes to remain continuous.

Aspect 33 concerns the apparatus or method of any preceding aspect, wherein the bicycle wheel hub is a freewheel type hub.

Aspect 34 concerns the apparatus or method of any preceding aspect, wherein the bicycle wheel hub is a cartridge type hub.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
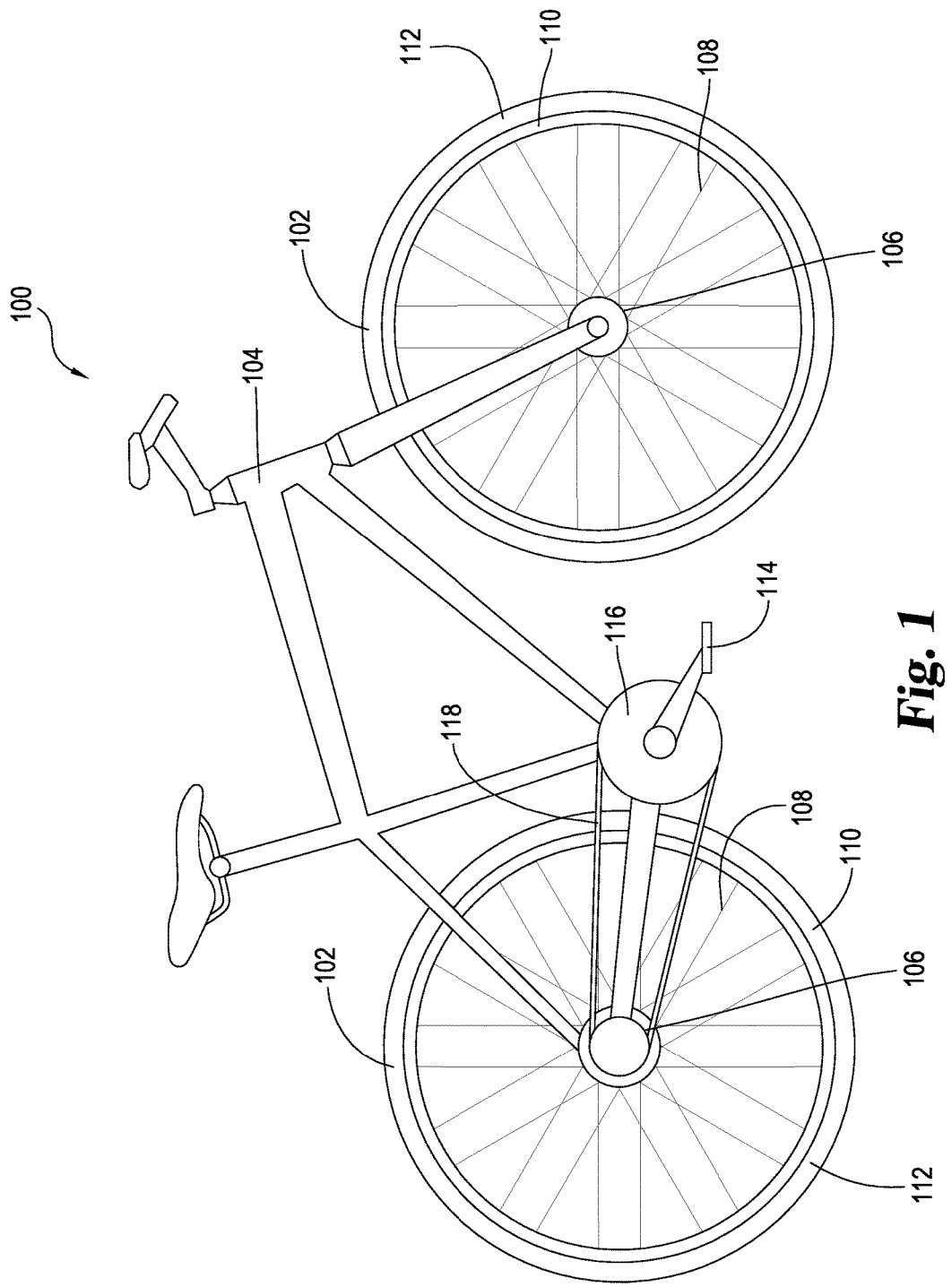
FIG. 1 is a side view of a bicycle.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows a side view of a bicycle 100 with bicycle wheels 102 that are attached to a bicycle frame 104. Each wheel 102 includes a wheel hub 106, one or more spokes 108, a rim 110, and a tire 112 that is secured to the outer radial periphery of the rim 110. It should be recognized that the hubs 106 via axles are rotatably coupled to the bicycle frame 104, such as through the fork and rear dropouts. The spokes 108 extend radially outward from the hub 106 in order to connect the rim 110 to the hub 106. Typically, the spokes 108 are under tension when secured between the hub 106 and the rim 110. As will be explained below, all or part of the hub 106 is made from fiber reinforced materials. A rider via pedals 114 and a crank assembly 116 drive a chain 118 that in turn propel the bicycle 100.

Figure 2:
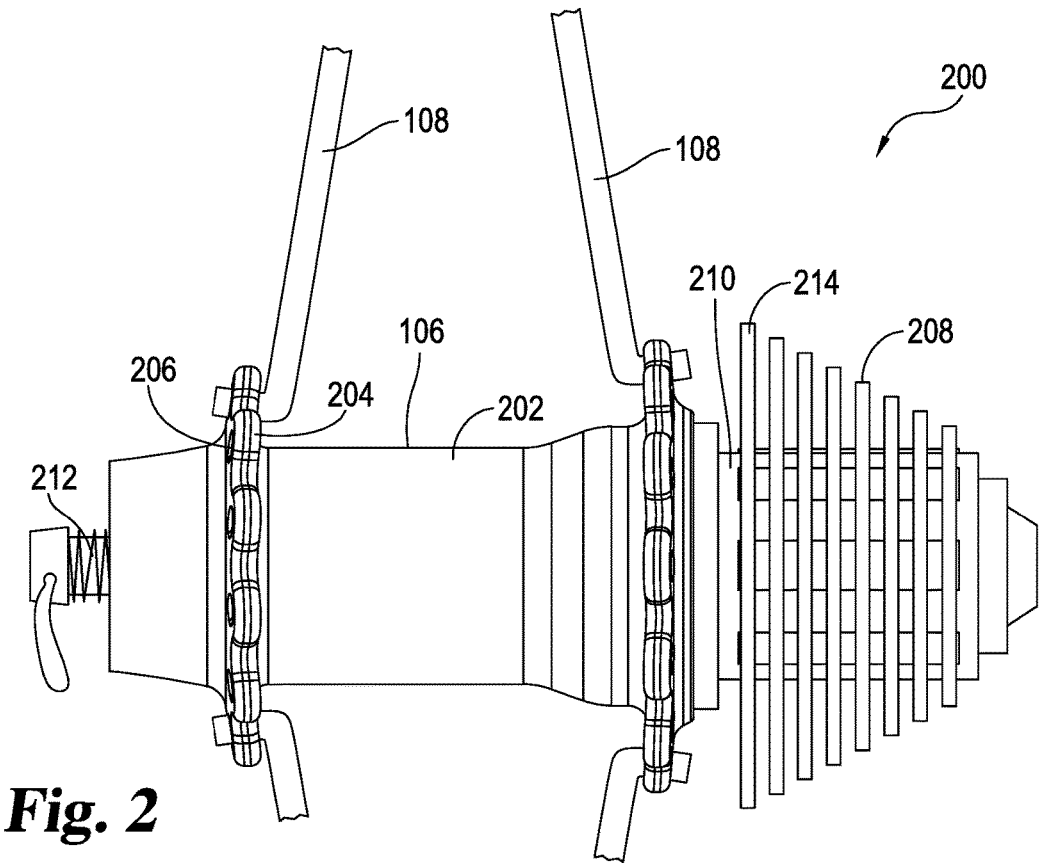
FIG. 2 is a side view of a drive assembly incorporated in the FIG. 1 bicycle.

FIG. 2 shows a side view of a drive assembly 200 that includes an example of one of the hubs 106 shown in FIG. 1. Among other things, the hub 106 includes a hub shell 202 and one or more spoke or hub flanges 204. As can be seen, the flanges 204 include one or more spoke holes 206 in which the spokes 108 are secured. In the illustrated example, the hub shell 202 and flanges 204 are made of fiber reinforced material, such as carbon fiber material. One of the many unique features of this hub 106 is its ability to incorporate the flange 204 even when fiber reinforced material is used. As will be explained below, a unique weaving pattern is used to form the spoke holes 206 to provide added strength so as to resist the pulling or tensile force applied by the spokes 108. Having the flange 204 on the hub 106 gives greater flexibility in adjusting the ride feel for the rider. The ride feel can be adjusted depending on the size, shape, and construction of the flange 204 on the hub 106. Generally speaking, as the flange 204 becomes larger, the wheel 102 becomes stiffer. For example, mountain bikers often prefer medium-sized flanges 204 for the hub 106 so as to have a nice balance of stiffness and comfort. On the other hand, road bike sprinters typically prefer large sized flanges 204 because the larger flange provides a stiffer or more rigid feel when the rider stands to sprint to the finish line. As can be seen, the flanges 204 extend generally transverse to the shell body 203. In other words, the flanges 204 extend radially outward from the shell body 203. In the illustrated example, the flanges 204 are angled slightly inward so as to properly direct the spokes 108 towards the rim 110.

Figure 3:
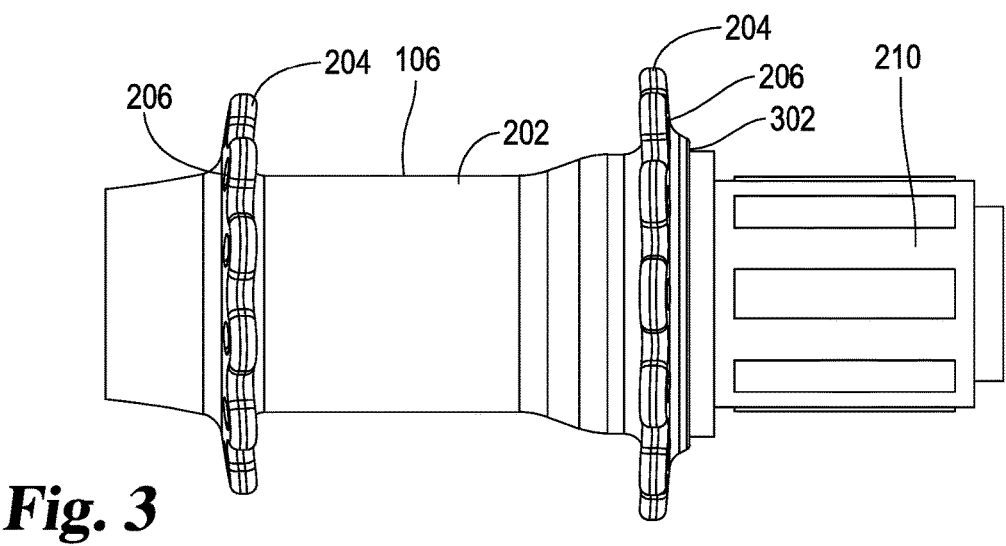
FIG. 3 is a side view of the FIG. 2 drive assembly with the cassette removed.

The drive assembly 200 further includes a cassette 208, a freehub 210, and an axle 212. The cassette 208 includes one or more cogs or gears 214 slidably disposed around the freehub 210. As should be recognized, the cogs 214 of the cassette 208 are selectively engaged to the chain 118 in order to rotate the wheel 102. The hub 106 along with the rest of the wheel 102 is designed to rotate about the axle 212. FIG. 3 shows the freehub 210 with the cassette 208 removed. As shown in FIG. 3, the freehub 210 engages a freehub engaging end 302 of the hub 106.

Figure 4:
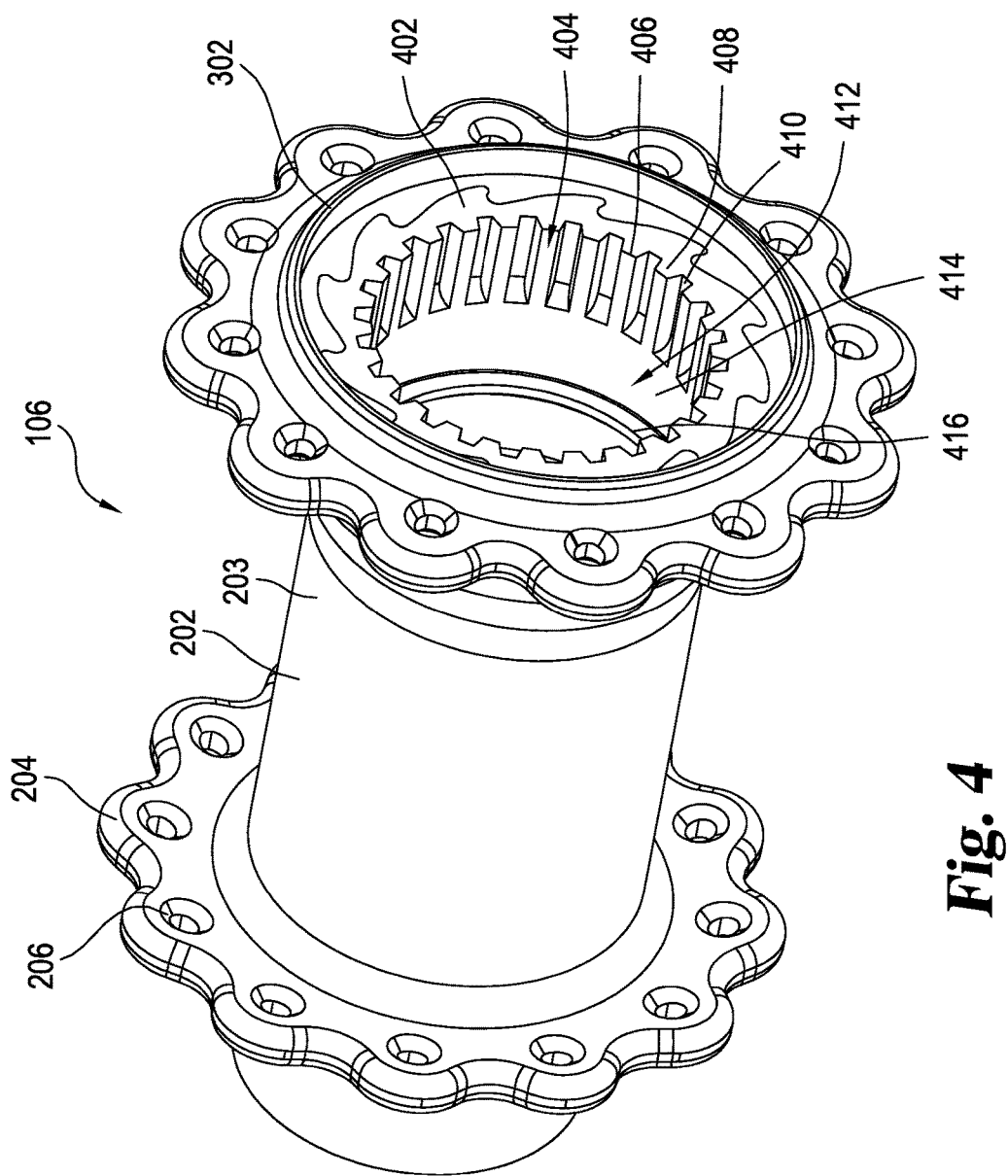
FIG. 4 is a perspective view of a wheel hub that forms part of the FIG. 2 drive assembly.
Figure 5:
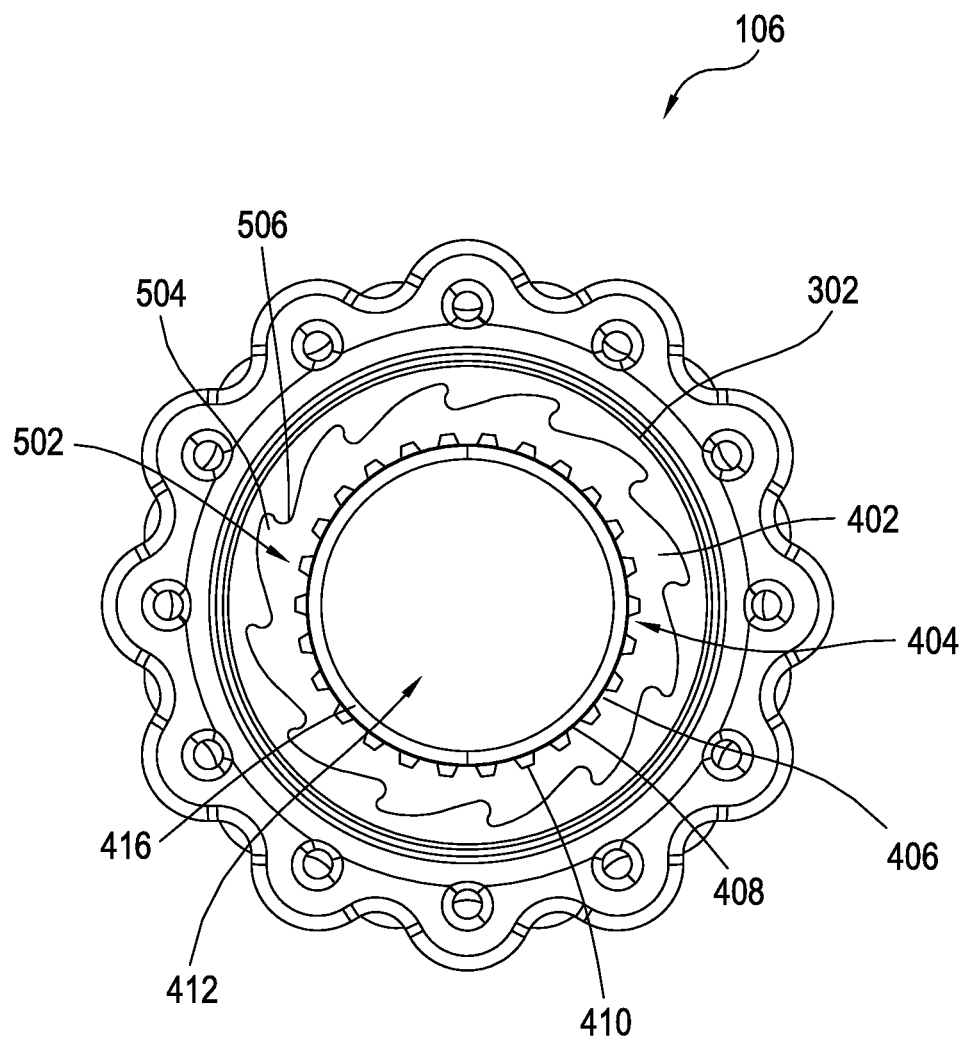
FIG. 5 is a front view of the FIG. 4 wheel hub.

FIGS. 4 and 5 respectively show perspective and front views of the hub 106. As illustrated, the hub 106 further includes a clutch or freehub adapter 402 that is received in an adapter engagement opening 404 at the freehub engaging end 302 of the hub 106. The clutch adapter 402 is designed so that the hub 106 can be used for differing clutch designs found on different freehubs without requiring significant modifications to the hub 106. Depending on the type of clutch mechanism used in the freehub 210, different clutch adapters 402 can be incorporated into the hub 106. The clutch adapter 402 includes a clutch engagement structure 406. In the illustrated example, the clutch engagement structure 406 includes a series of splines 408 that are configured to engage corresponding splines on a clutch plate, such as commonly found on freehubs manufactured by DT Swiss. The splines 408 are created by grooves 410 machined or otherwise formed in the interior of the adapter 402. As can be seen, the clutch adapter 402 has a generally cylindrical shape and defines an axle cavity 412 through which the axle 212 of the wheel 102 extends. Around the axle cavity 412, the clutch adapter 402 includes a spring receiving section 414 in which a spring for biasing the clutch plates is received. A retention flange 416 is disposed opposite the splines 408 and is configured to retain the spring used to bias the clutch plates.

In one example, the hub shell 202 and the clutch adapter 402 are made of different materials. As should be appreciated, the hub 106 experiences significant stresses during use. By being able to be made of material different from the rest of the hub 106, the adapter 402 can be made of material more suitable for engaging the clutch mechanism of the freehub 210. This allows the hub 106 to be both lightweight and have a long operational life. The clutch adapter 402 can be made of materials able to be manufactured with tighter tolerances than the rest of the hub shell 202. In addition, the clutch adapter 402 can have better frictional, wear, thermal, strength, and/or other properties as compared to the material composing the hub shell 202. For instance, the hub shell 202 in the illustrated example is made of a fiber reinforced material and the clutch adapter 402 is made of a metal. In one particular example, the hub shell 202 is made from carbon fiber material and the clutch adapter 402 is made of aluminum. This construction makes the hub 106 both lightweight and durable.

When the rider is actively pedaling the pedals 114 of the bicycle 100, the clutch adapter 402 experiences significant torque and strain. To ensure that the torque is properly applied to the wheel hub 106 without any slippage, the clutch adapter 402 incorporates an anti-rotation structure 502. Looking at FIG. 5, the wheel hub 106 further includes an anti-rotation structure 502 that inhibits rotation of the clutch adapter 402 relative to the hub shell 202. It was discovered that without this anti-rotation structure 502, the clutch adapter 402 would tend to slip or strip over time such that the torque would not be transmitted to the hub shell 202. In the illustrated example, the anti-rotation structure 502 includes one or more teeth 504 extending from the outer periphery of the clutch adapter 402 so as to bite into the hub shell 202. The hub shell 202 likewise has corresponding teeth 506 that are designed to engage with teeth 504 of the clutch adapter 402. Since the wheel 102 is designed to spin freely in one rotational direction, the teeth 504 of the clutch adapter 402 have a saw tooth shape that bite into the teeth 506 of the hub shell 202.

Figure 6:
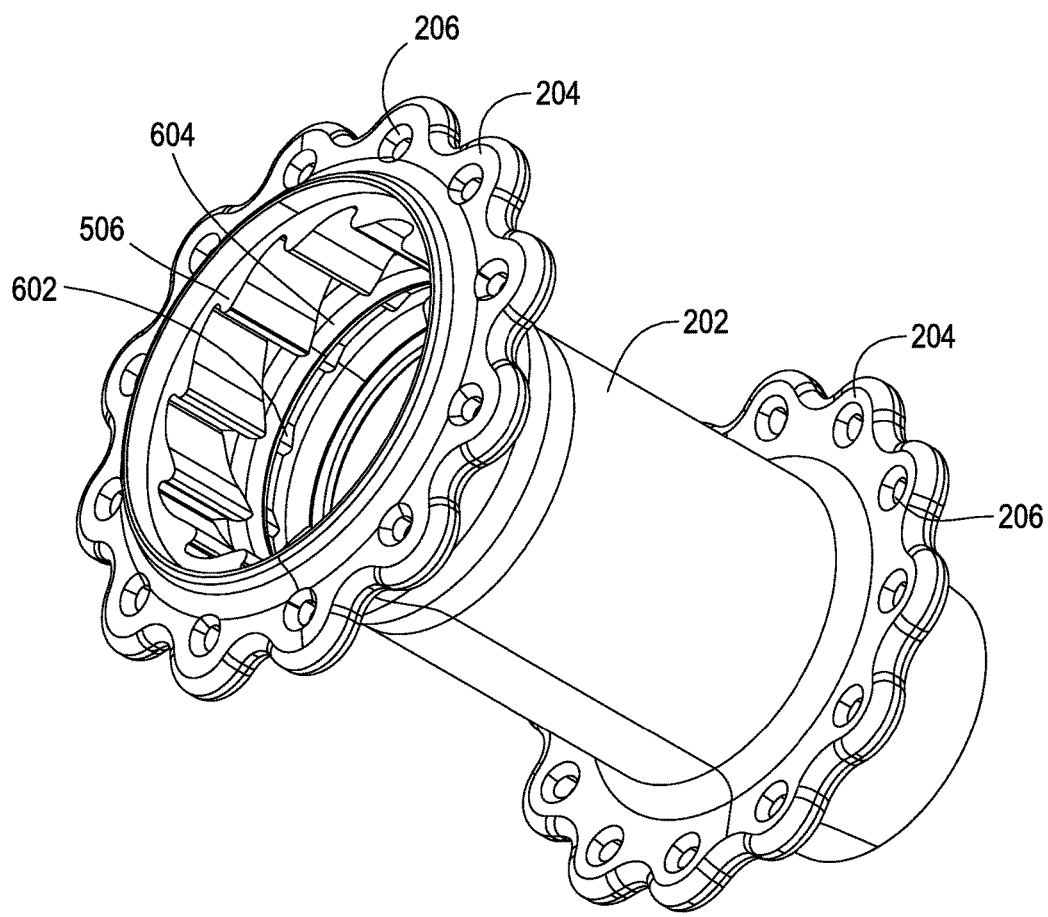
FIG. 6 is a perspective view of a hub shell that forms the FIG. 4 wheel hub.
Figure 7:
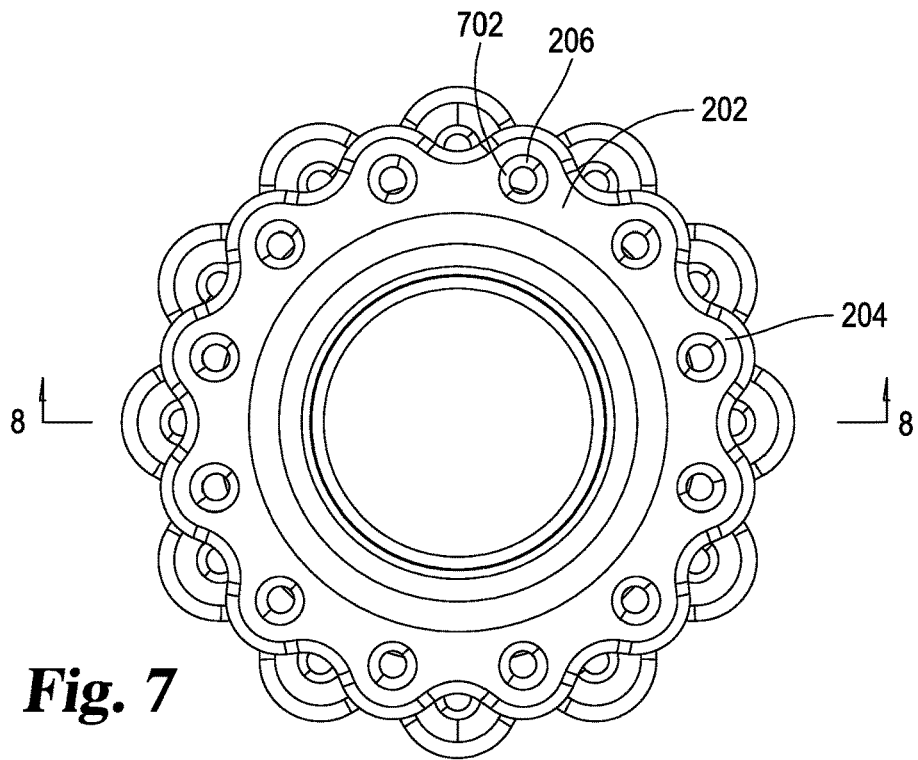
FIG. 7 is a back view of the FIG. 6 hub shell.
Figure 8:
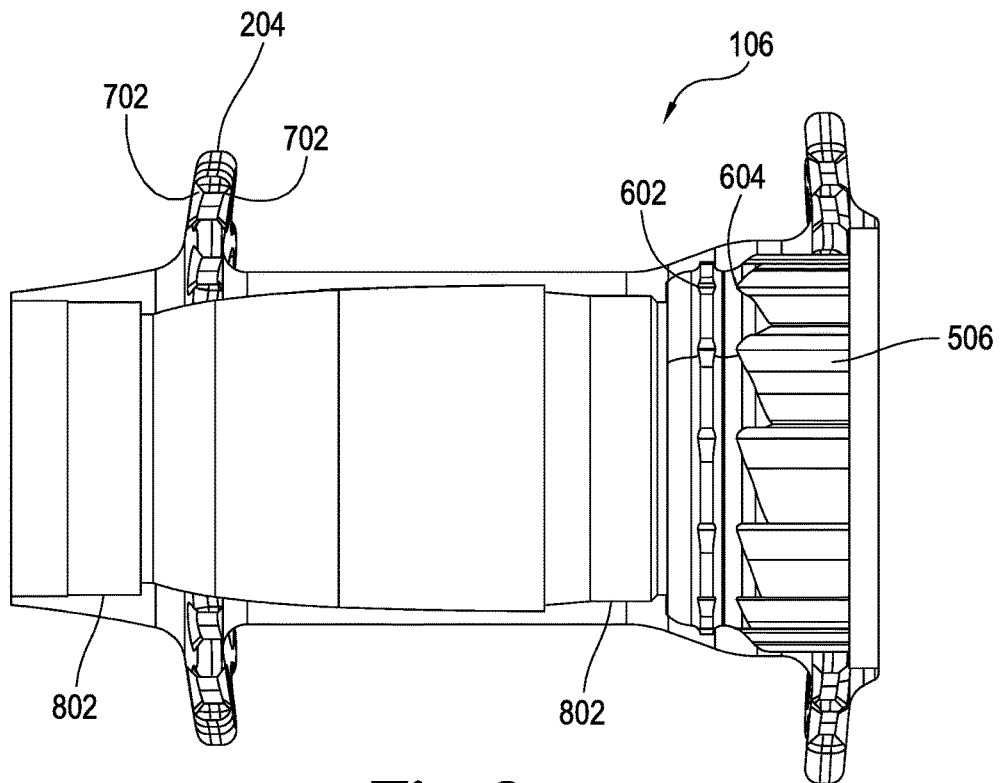
FIG. 8 is a cross-sectional view of the FIG. 6 hub shell as taken along line 8-8 in FIG. 7.

FIG. 6 shows a perspective view of the hub shell 202 without the adapter 402, and FIG. 7 shows an end view of the hub shell 202. FIG. 8 shows a cross-sectional view of the hub shell 202 as taken along line 8-8 in FIG. 7. As can be seen in FIGS. 6 and 8, the hub shell 202 includes a second set of adapter engagement teeth 602 that are designed to prevent slippage of the adapter 402 relative to the hub shell 202. The adapter engagement teeth 602 act as a backup in case the teeth 506 in the hub shell 202 fail. The adapter engagement teeth 602 are separated from the first set of teeth 506 by a divider wall 604. In other variations, the hub shell 202 can include just a single set of teeth 506 or more than two sets of teeth.

Looking at FIGS. 7 and 8, the spoke holes 206 in the flange 204 each include a counter sink section 702. The counter sink sections 702 provide greater flexibility for positioning the spokes 108. In addition, the counter sink sections 702 help to eliminate unnecessary wear around the spoke holes 206. As will be explained in greater detail below, the counter sink sections 702 of the spoke holes 206 are molded into the flange 204 so as to provide greater strength and durability to the flange 204. Drilling or otherwise machining the spoke holes 206 and the countersinks 702 would cause breaks in the fiber reinforced material which in turn weakens the material around the spoke holes 206. Due to the high tensile strength applied by the spokes 108, any breakage in the fiber reinforced material can cause premature catastrophic failure of the flange 204 around the spoke holes 206. Molding the counter sink sections 702 and the spoke holes 206 reduces or even eliminates this source for catastrophic failure.

Turning to FIG. 8, the technique for manufacturing the hub 106, which will be described below, also allows the formation of bearing races 802 without the need of extra machining steps which could in turn weaken the hub 106. As can be seen, the bearing races 802 have a generally flat cylindrical shape configured to receive bearings. In one example, the bearing races 802 are configured to receive cartridge type bearings, but it should be recognized that the bearing races 802 can be configured to receive other types of bearings, such as cup and cone bearings, etc.

Figure 9:
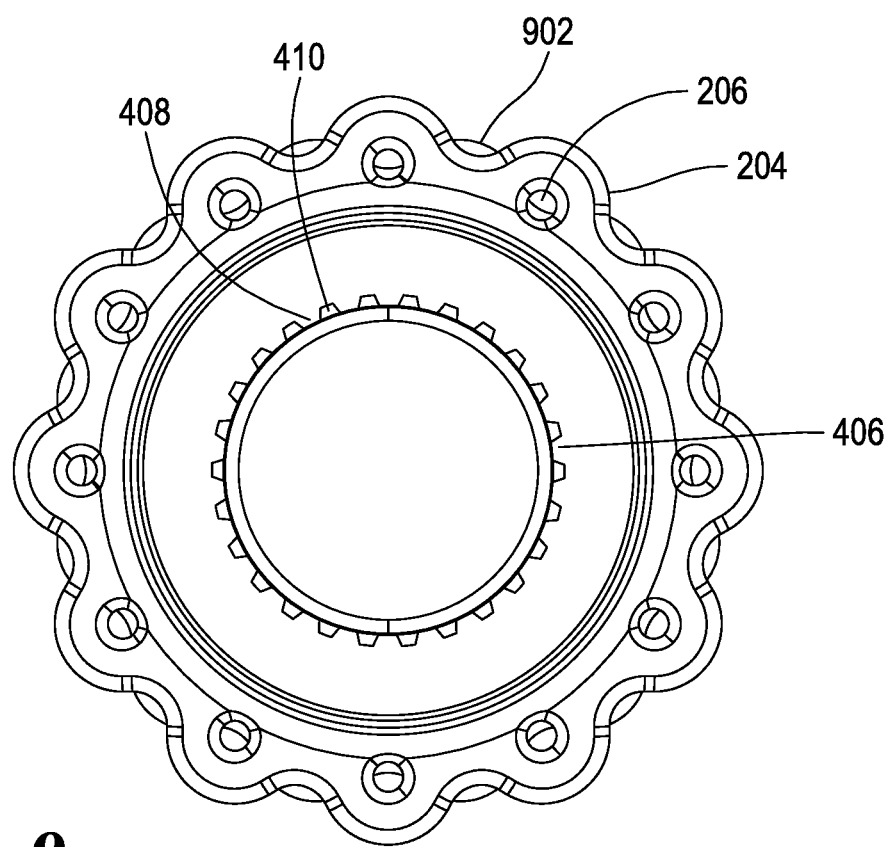
FIG. 9 is a front view of a wheel hub including an integral clutch engagement structure.

FIG. 9 shows a front view of a wheel hub 902 according to another example. The hub 902 shown in FIG. 9 shares almost all of the features of the previously described wheel hub 106, such as the flange 204 and spoke holes 206. For a complete description of these common features, please refer to the previous description of the hub 106. As can be seen, however, instead of having a separate adapter 402, the splines 408 are integrally formed within the hub 902. In other words, the hub 902 in FIG. 9 does not include a distinct clutch adapter 402 such as in the example described above, but instead, the functions of the hub shell and the adapter are incorporated into a unitary structure. It was unexpectedly discovered that the entire hub 902 could be manufactured with fiber reinforced material and still have the requisite durability to withstand the high torque loads applied by the clutch of the freehub 210. It was at least initially thought that the fiber reinforced material in the wheel hub 902 would not be able to withstand the constant compressive loads applied by the clutch in the freehub 210 when the bike 100 is peddled during long-term use. In the example illustrated in FIG. 9, the hub 902 is completely made of fiber reinforced material, and in one particular example, the hub 902 is made completely of carbon fiber material. To provide greater strength, the splines 408 and grooves 410 are molded into the hub 902. By manufacturing the splines 408 through a molding process, rather than by machining, the fiber reinforced material can remain intact so as to provide greater strength when under load.

One technique for manufacturing the wheel hubs 106, 902 will now be described with reference to FIGS. 10-16. This technique allows the hub 106, 902 to be made of fiber reinforced material with flanges 204 having spoke holes 206 that are durable enough to withstand the constant forces applied to the wheel 102 over long-term use. For the sake of clarity, the technique will be specifically described with reference to manufacturing the wheel hub 106 that is illustrated in FIG. 4, but it should be recognized that this technique can be used to manufacture other types of wheel hubs, such as the hub 902 illustrated in FIG. 9 as well as other designs. The technique will be also described with respect to manufacturing the hub 106 with carbon fiber material, but it should be recognized that the hub 106 can be manufactured using other types of fiber reinforced materials. To manufacture the hub shell, one or more plies of fiber reinforced material are arranged in one or more molds. The fiber reinforced material can be dry fiber material or fiber material that already contains a measured amount of resin called "prepreg". Dry fibers are "wetted" with resin either by hand or the resin is injected into a closed mold. The part is then cured, leaving the matrix and fibers in the shape created by the mold which in this case is in the shape of the hub shell. Heat and/or pressure can be used to cure the resin and improve the quality of the final part.

Figure 10:
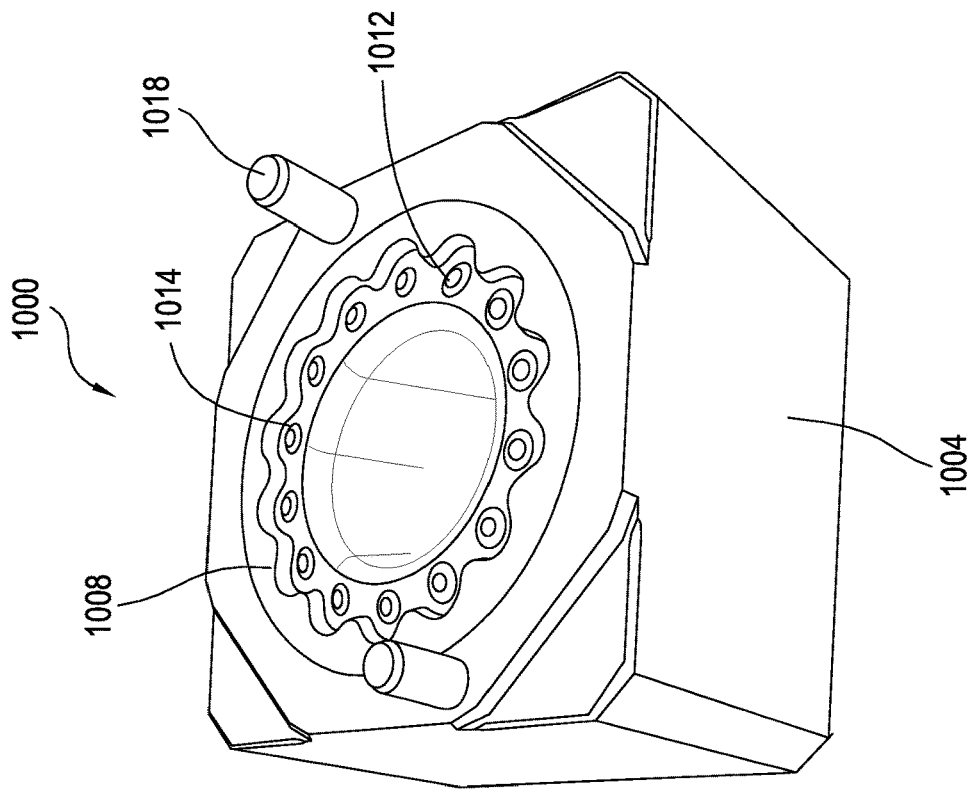
FIG. 10 is a perspective view of a mold assembly used to form the FIGS. 4 and 9 wheel hubs.
Figure 10:
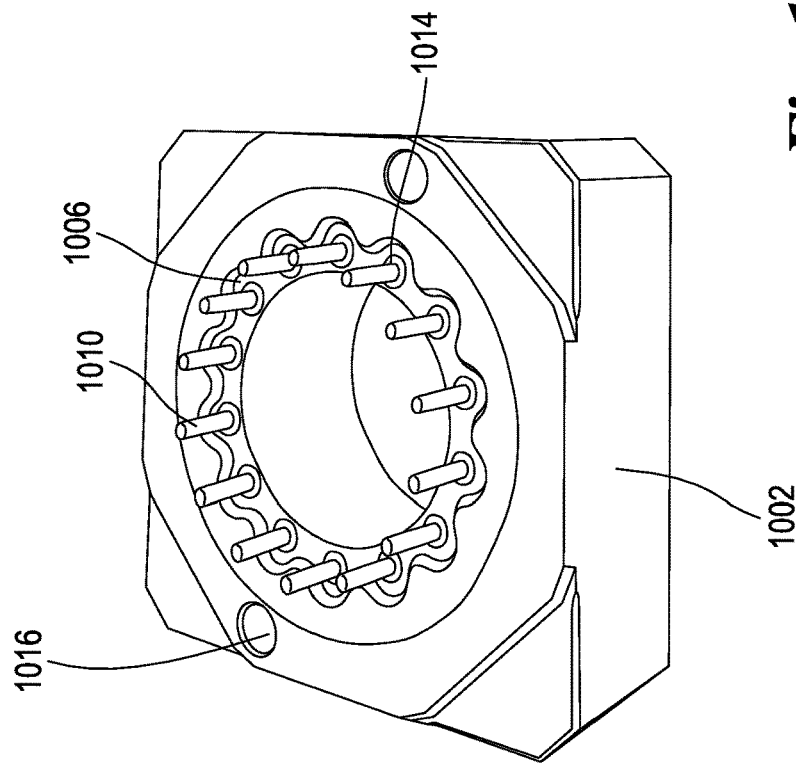

FIG. 10 shows a perspective view of a mold assembly 1000 that is used to manufacture the hub 106. The mold assembly 1000 includes a first mold 1002 and a second mold 1004. The first mold 1002 includes a flange cavity 1006, and the second mold 1004 includes a flange cavity 1008 that coincides with the flange cavity 1006 in the first mold 1002. Together the flange cavities 1006 and 1008 define the shape of the flange 204 of the hub 106. Inside the flange cavity 1006, the first mold 1002 has one or more spoke hole pins 1010 that are used to define the spoke holes 206 in the hub 106. The second mold 1004 has spoke receiving openings 1012 that are oriented to receive the spoke pins 1010 from the first mold 1002. Around each pin 1010 and opening 1012 of the molds 1002, 1004 have counter sink protrusions 1014 that form the shape of the counter sink section 702 of the spoke holes 206. The spoke pins 1010 and countersink protrusions 1014 allow the spoke holes 206 and countersink sections 702 to be formed without requiring the cutting or drilling of the carbon fiber material used to form the hub 106. By not cutting the carbon fiber strands, the strength of the spoke holes 206 is enhanced which can be helpful in resisting the significant loads applied by the spokes 108. The first mold 1002 further includes one or more guide pin openings 1016 configured to receive corresponding guide pins 1018 on the second mold 1004 in order to properly align the molds 1002, 1004 together.

Figure 11:
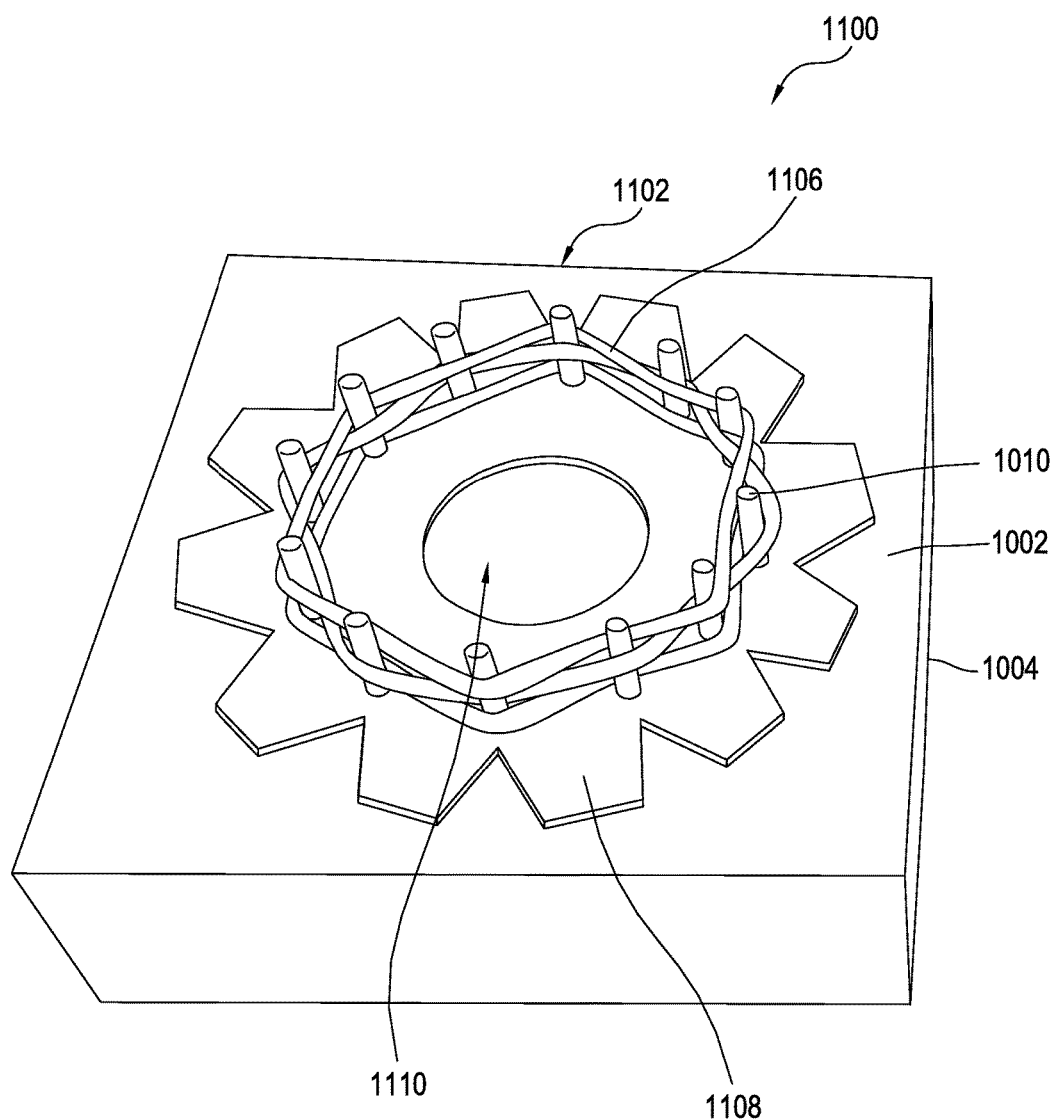
FIG. 11 is a perspective view showing the weaving pattern of a tow fiber reinforced material used to form the spoke holes in the hub shell.

FIG. 11 shows a perspective view of an assembly 1100 that includes the first mold 1002 and fiber reinforced material 1102 for forming the flange 204 of the hub 106. As illustrated, the fiber reinforced material 1102 includes an outer covering ply 1104 and tow 1106 that is wrapped around the spoke pins 1010 of the first mold 1002. For this particular example, the outer covering ply 1104 includes a carbon fiber fabric. The spoke pins 1010 are inserted between the filaments of the carbon fiber fabric such that the filaments generally remain intact. The carbon fiber ply 1104 includes one or more tabs 1108 that extend in a radially outward direction between the pins 1010. At a location inside the pins 1010, the outer covering ply 1104 has a radial inner opening 1110 that in part forms the axle cavity 412 of the hub 106. During manufacturing, the tabs 1108 are folded over the tow 1106 between the pins 1010 and towards the opening 1110 so as to cover the tow 1106. As a result, the pins 1010 of the first mold 1002 extend between the individual tabs 1108. In the illustrated example, the tow 1106 is in the form of a carbon fiber rolled tow, but in other examples, other types of tow can be used. As can be seen, the tow 1106 is woven between pins 1010 in a basket weave type pattern such that alternating layers of the tow 1106 contact opposite sides of the pins 1010. By weaving the tow 1106 around the pins 1010 such that the tow 1106 remain continuous, the strength of the flange 204 around the spoke holes 206 is dramatically enhanced. It should be recognized that in other examples, the tow 1106 can be woven in other patterns than is shown.

Figure 12:
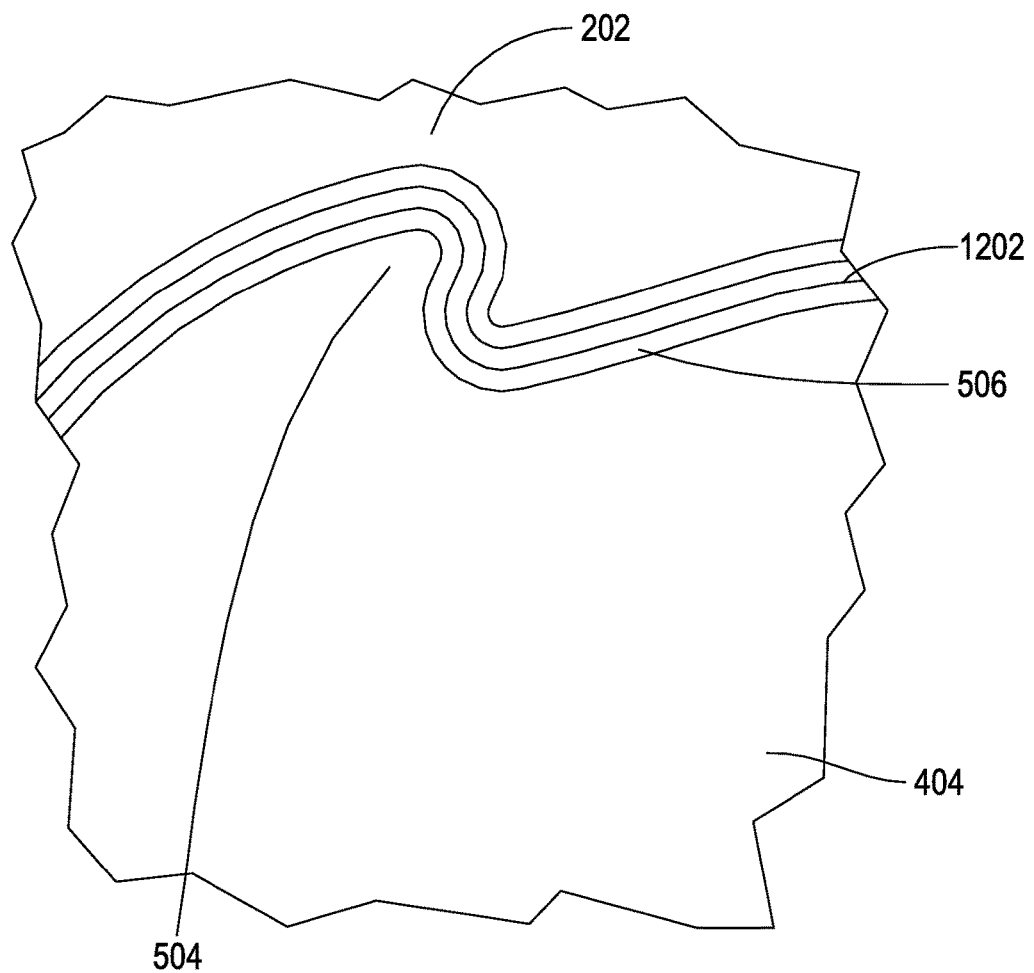
FIG. 12 is an enlarged cross-sectional view showing the layering structure of the plies of fiber reinforced material used to form the interface between a clutch adapter and the hub shell.
Figure 13:
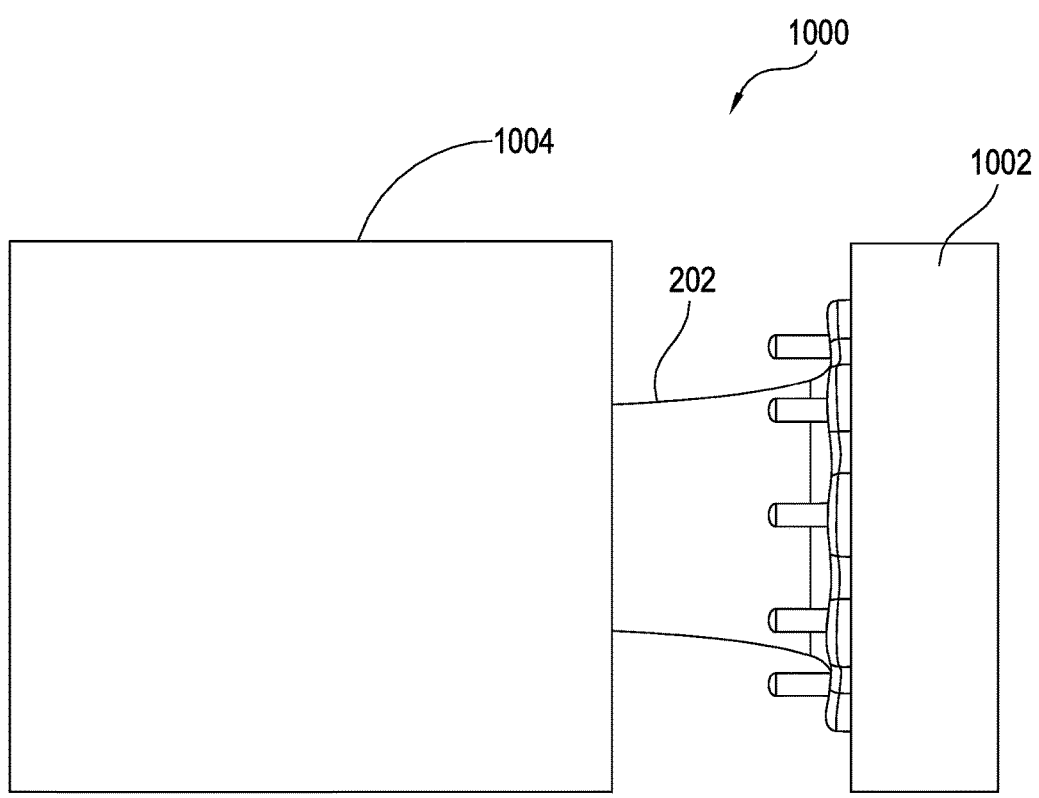
FIG. 13 is a side view of the FIG. 10 mold assembly as the hub shell is being removed.
Figure 14:
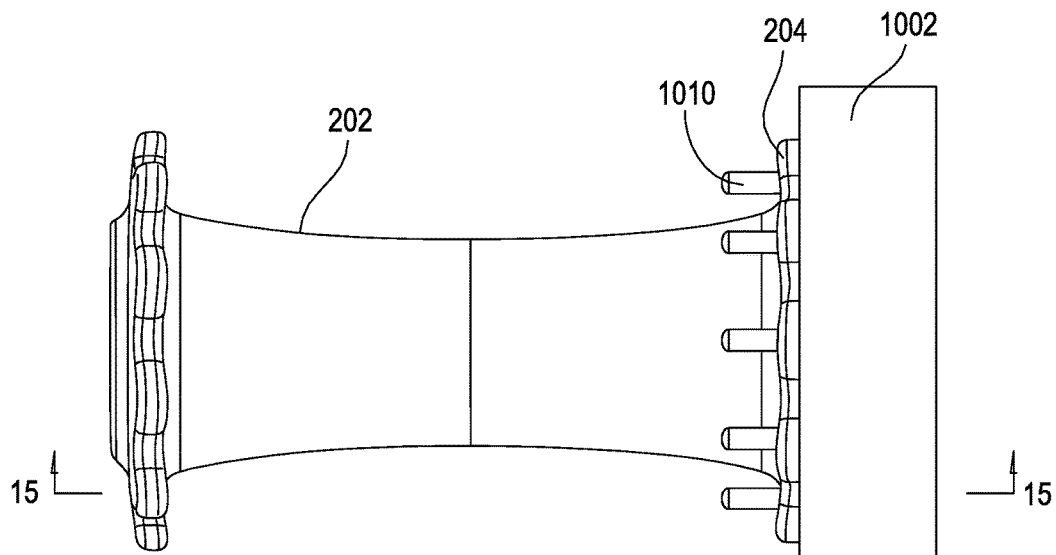
FIG. 14 is a side view of the hub shell being further removed from the FIG. 10 mold assembly.

Other plies and/or layers of fiber reinforced material, such as carbon fiber materials, can be layered so as to form the rest of the shell 202 and/or the hub 106. In one example, the adapter 402 is molded into place as the hub shell 202 is produced by layering the fiber reinforced material. In other examples, the adapter 402 can be inserted, adhered to, and/or otherwise attached to the hub shell 202 after the hub shell 202 is molded. FIG. 12 shows an enlarged cross-sectional view of the interface between the hub shell 202 and the adapter 404. As mentioned before, the hub shell 202 is formed by a layered series of plies 1202 that form the overall shape of the hub shell 202. As can be seen, the individual ply layers 1202 generally conform to the shape of the teeth 506 of the hub shell 202 so as to coincide to the shape of the teeth 504 on the adapter 404. In particular, the ply layer 1202 has a saw tooth shape so as to provide added strength at the teeth 506 of the hub shell 202.

Figure 15:
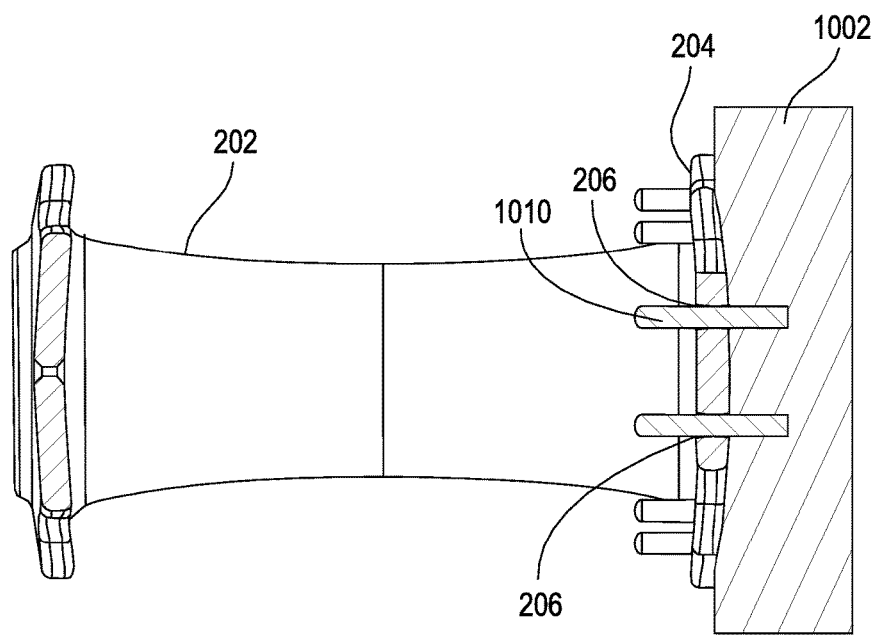
FIG. 15 is a cross-sectional view of the hub shell and mold assembly as taken along line 15-15 in FIG. 14.
Figure 16:
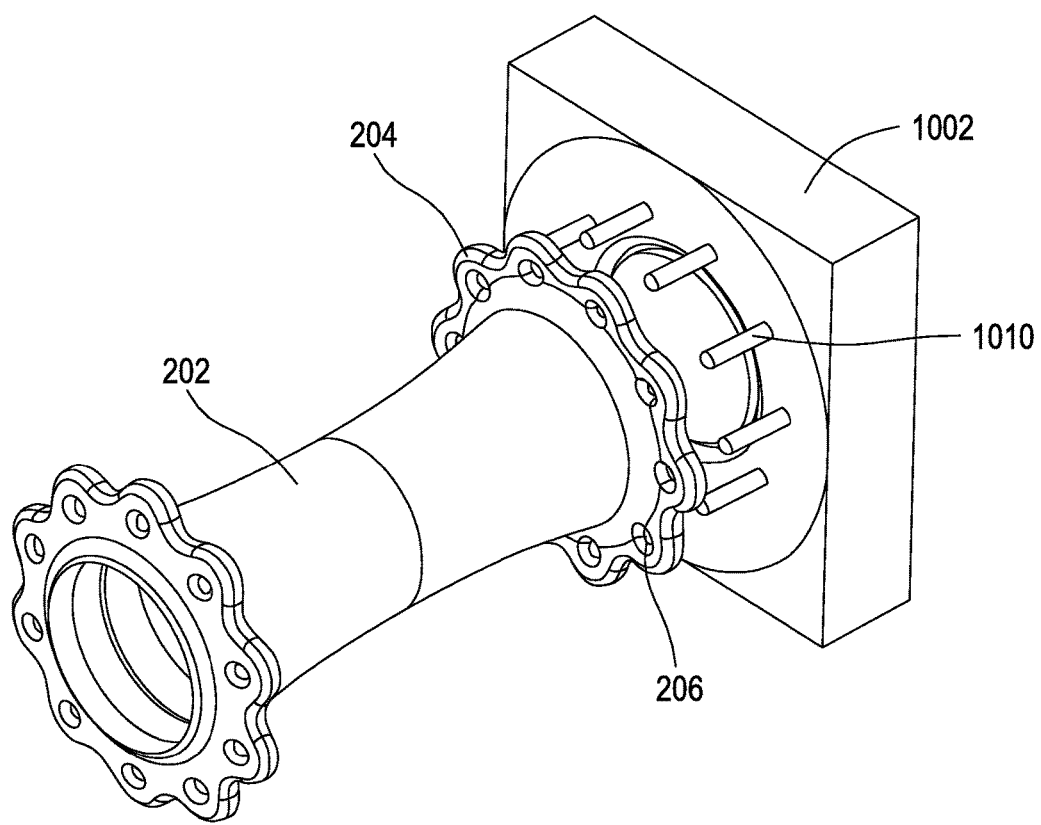
FIG. 16 is a perspective view of the hub shell being disengaged from spoke pins in the FIG. 10 mold assembly.

During molding of the hub 106, the first mold 1002 and the second mold 1004 are clamped together. Heat and pressure are applied to the closed mold assembly 1000 in order to cure the hub shell. After the proper curing time has occurred, the hub shell 202 is removed from the mold assembly as is depicted in FIGS. 13, 14, 15, and 16. FIG. 15 shows a cross-sectional view of the hub shell 202 still attached to the first mold 1002 as taken along line 15-15 in FIG. 14. FIG. 16 illustrates a perspective view of the hub shell 202 being released from the first mold 1002. Again, as shown, the spoke pins 1010 aid in the molding of the spoke holes 206 without damaging or otherwise cutting the fibers in the fiber reinforced material. Consequently, the flange 204 can be formed so as to extend generally transverse to the rest of the hub shell 202 while still providing adequate strength around the spoke holes 206 so as to prevent the spokes 108 from pulling out of the spoke holes 206. Having this ability to produce such flanges 204 allows the wheel manufacturer to provide different ride properties for the wheel 102, depending on the rider's tastes as well as desired riding characteristics. The size and shape of the flanges 204 can be varied depending on the needs of the rider. Flange spacing can affect the lateral stiffness of the wheel, with wider being stiffer. Flange diameter can also impact the torsional stiffness of the wheel and the number of spoke holes that the hub can accept, with larger diameters being typically stiffer and accepting more holes Asymmetrical flange diameters can at least partially mitigate the adverse effects of asymmetrical spacing necessary on rear wheels with many sprockets.

Glossary of Definitions and Alternatives

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's and Random House dictionaries. As used in the specification and claims, the following definitions apply to the following terms or common variations thereof (e.g., singular/plural forms, past/present tenses, etc.):

"Bearing" refers generally to a machine element that constrains relative motion and reduces friction between moving parts to only the desired motion, such as a rotational movement. The bearing for example can be in the form of loose ball bearings found in a cup and cone style hub. The bearing can also be in the form of a cartridge bearing where ball bearings are contained in a cartridge that is shaped like a hollow cylinder where the inner surface rotates with respect to the outer surface by the use of ball or other types of bearings.

"Bicycle" is used in the broader or more generic sense to generally refer to a human powered land vehicle that includes one or more wheels. The term "bicycle" can refer to a vehicle having two wheels, but it also refers to vehicles having one wheel (i.e., a unicycle), three wheels (i.e., a tricycle), or even more wheels.

"Carbon Fiber Material" refers generally to a type of fiber reinforced material that includes, but is not limited to, a material of thin, strong crystalline filaments of carbon, used as a strengthening material, such as in resins and ceramics. For example, carbon fiber materials include strong lightweight synthetic fibers made especially by carbonizing a fiber at high temperatures.

"Composite Material" refers generally to any material including a fiber reinforcement and an encapsulating matrix. A fiber (a fiber or fiber tow typically includes a bundle of filaments) is generally considered to be continuous if the fiber extends from one edge of a ply of material to another edge, most often the opposing edge. While all fibers in a composite material need not be continuous, a substantial majority of the fibers will be continuous in some examples.

"Couple" or "coupled" refers generally to an indirect and/or direct connection between the identified elements, components, and/or objects. Often the manner of the coupling will be related specifically to the manner in which the two coupled elements interact.

"Freehub" refers to a component used in conjunction with a bicycle hub that incorporates a ratcheting mechanism. Typically, the freehub is the ratcheting mechanism attached to the rear hub of most modern derailleur bike hubs. The freehub can use a splined cylinder to hold the cassette cogs. In one example, a set of sprockets (called a "cassette") are mounted onto a splined shaft of the freehub to engage the chain. Inside the freehub mechanism there are bearings and a clutch system, usually ratcheting teeth and a pawl. The clutch mechanism is a part of the hub, in contrast to a freewheel, an older technology, which contains both the sprockets and a ratcheting mechanism in a single unit separate from the hub. The freehub can include a number of different clutch mechanisms, such as a pawl-ratchet design or a disc type design, to name just a few examples. The cassette cogs usually have no moving parts, and all the moving parts usually (but not always) are located inside the freehub body.

"Fiber Reinforced Material" refers generally to any material including fibers of high strength and modulus embedded in or bonded to a matrix with distinct interfaces (boundary) between them.

"Hub" refers generally to the central part of a wheel about which the wheel rotates. The hub performs a number of functions, including, but not limited to, housing the bearings used to spin about an axle and providing an anchor point for the spokes that hold the rim in position. The hub can have a one-piece construction with a press-in cartridge or can have free bearings. The hub can include freehub and freewheel type designs.

"Hub Shell" refers generally to the part of the hub to which the spokes (or disc structure) is attached. In one example, the hub shell of a spoked wheel generally has two flanges extending radially outward from the axle. The flanges are usually (but not always) canted inwards in the direction of the rim to reduce stress on the spoke elbows. Each flange can have holes, slots, and/or other structures to which spokes are affixed. In other examples, the hub shell has an additional flange in the center of the hub. In further examples, the hub shells do not have a noticeable flange, and the spokes are sometimes attached to the edge of the hub but not through visible holes. In still yet other designs, the hub has a threaded hub shell that the spokes thread into. The hub shell can have a unitary structure or can be made from multiple components.

"Laminate" refers to a plurality of plies that have been stacked (or laid) one on top of another. As used herein, the term refers to both the plurality of plies before curing and/or consolidation, as well as after consolidation as is apparent from the term's use in context. The orientations of the fibers of each particular layer may vary relative to the orientations of the fibers in other layers to create a consolidated laminate having desired strength and stiffness characteristics in various directions. By utilizing and tailoring plies with differently orientated fibers, a composite material's designer or engineer can tailor the mechanical properties of an advanced composite laminate to withstand the forces that the laminate is likely to encounter during use.

"Ply" refers generally to a single layer of high strength continuous fibers aligned in a common orientation, or in the case of a fabric in two and possibly three, four, or more orientations. One of the most common plies utilized in composite materials is where substantially all the fibers in the ply are aligned in a single direction. A "ply" may also be referred to as a layer. A ply can include a prepreg or a single sheet of dry fabric or dry sheet of unidirectional fibers often held together with a small number of bias threads or fibers. In other examples, the fibers in the ply can be woven into cloth. For instance, the fibers can be woven into any number of patterns, including, but not limited to, twill, satin, plain, unidirectional, bidirectional, triaxial, and quadaxial patterns, to name just a few.

"Prepreg" is short for Pre-impregnated cloth and refers generally to a ply of composite material including one or more types of reinforcing fiber at least partially impregnated and/or encapsulated with a resin. When the resin is a thermoset, the resin is not fully cured and typically requires the application of heat to complete cure. When the resin is a thermoplastic, the resin is typically a solid that melts and flows under the application of heat and pressure to further encapsulate the fibers as well as join adjacent plies of material together. For example, the pre-preg can include carbon fiber, fiber glass, Kevlar, etc. that is pre wetted with an epoxy. Examples of pre-preg can include wet pre-preg cloth or dry pre-preg cloth.

"Tow" refers to a bundle of continuous strands or filaments, such as man-made fibers (e.g., carbon fibers). Strands are then bundled together to create a tow. A "rolled tow" refers to a specific type of bundled fibers in which the fibers are twisted (or rolled) within the bundle. In other examples, the fibers in the tow are untwisted.

It should be noted that the singular forms "a", "an", "the", and the like as used in the description and/or the claims include the plural forms unless expressly discussed otherwise. For example, if the specification and/or claims refer to "a device" or "the device", it includes one or more of such devices.

It should be noted that directional terms, such as "up", "down", "top" "bottom", "fore", "aft", "lateral", "longitudinal", "radial", "circumferential", etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

As noted before, one of the many unique features of this hub design is its ability to incorporate the flange even when fiber reinforced material is used. A unique weaving pattern is used to form the spoke holes to provide added strength so as to resist the pulling or tensile force applied by the spokes. It should, however, be recognized that this unique weaving pattern can be incorporated into other hub designs that do not necessarily incorporate flanges. In the illustrated examples, the flanges are angled slightly inward so as to properly direct the spokes towards the rim. However, in other examples, the flanges can extend perpendicular to the body of the hub shell and/or at different angles than is shown. Furthermore, while the hub is described as being used in conjunction with a freehub design, it is contemplated that one or more of the illustrated features can be incorporated into freewheel type designs. For instance, certain features of the flange construction can be incorporated into a freewheel type hub.

The clutch engagement structure shown in the drawings includes a series of splines that are configured to engage corresponding splines on a clutch plate, such as commonly found on freehubs manufactured by DT Swiss. The clutch engagement structure can be configured differently for other types of clutch mechanisms, however. For instance, the clutch engagement structure can include a series of internal pawls for engaging on a traditional ratchet and pawl freehub type clutch mechanism. Moreover, it is envisioned that anti-rotation structures that inhibits rotation of the clutch adapter relative to the hub shell can have a different shape than is shown in the drawings. In one example, the hub shell and the clutch adapter are described as being made from different materials, but in other examples, the hub shell and clutch adapter can be made of the same materials, such as a fiber reinforced material, like carbon fiber.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A method, comprising:
   forming one or more spoke holes by bending one or more reinforcement fibers of a fiber reinforced material around one or more spoke pins where the reinforcement fibers remain continuous around the one or more spoke holes, wherein the one or more reinforcement fibers are oriented in a woven pattern around the one or more spoke holes to remain intact around the one or more spoke holes; and
   molding the fiber reinforced material into a shape of a hub shell and one or more flanges extending from the hub shell at an outer radial direction; and wherein said forming the one or more spoke holes includes forming the one or more spoke holes in the one or more flanges.

2. The method of claim 1, wherein said forming the spoke holes includes:
weaving one or more tows of the fiber reinforced material around the spoke pins; and
covering the one or more tows with an outer covering made of one or more plies of the fiber reinforced material.

3. The method of claim 2, wherein said weaving the one or more tows includes weaving the one or more tows in a basket weave type pattern around the one or more spoke pins.

4. The method of claim 2, wherein the one or more tows include rolled tows.

5. The method of claim 1, wherein said forming the one or more spoke holes includes positioning the one or more spoke pins to extend completely through opposing sides of the flange.

6. The method of claim 1, wherein:
providing a countersink protrusion around at least one of the spoke pins; and
said molding the fiber reinforced material includes molding a counter sink section into the flange with the countersink protrusion.

7. The method of claim 1, further comprising:
applying the fiber reinforced material around a clutch adapter before said molding.

8. The method of claim 7, further comprising:
creating an anti-rotation structure to inhibit rotation of the clutch adapter relative to the hub shell by folding plies of the fiber reinforced material to engage teeth of the clutch adapter.

9. The method of claim 8, wherein said creating the anti-rotation structure includes molding a first set of adapter engagement teeth configured to engage the clutch adapter.

10. The method of claim 9, wherein said creating the anti-rotation structure further includes molding a second set of adapter engagement teeth divided from the first set of adapter engagement teeth by a divider wall.

11. The method of claim 7, further comprising:
making the clutch adapter out of metal; and
wherein the fiber reinforced material is a carbon fiber material.

12. The method of claim 1, further comprising:
positioning one or more plies of the fiber reinforced material to form a clutch engagement structure that is integrally formed in the hub shell.

13. The method of claim 1, further comprising:
forming a clutch engagement structure by molding a series of splines and grooves in the hub shell around an axle cavity.

14. The method of claim 1, wherein said molding includes curing the fiber reinforced material by applying heat and pressure to a mold that includes the one or more spoke pins.

15. The method of claim 1, further comprising:
securing a spoke to each of the one or more spoke holes.

16. The method of claim 1, wherein the one or more flanges extend transverse to the hub shell.

17. A method, comprising:
forming one or more spoke holes by bending one or more reinforcement fibers of a fiber reinforced material around one or more spoke pins where the reinforcement fibers remain continuous around the one or more spoke holes;
molding the fiber reinforced material into a shape of a hub shell with the one or more spoke holes; and
applying the fiber reinforced material around a clutch adapter before said molding.

18. The method of claim 17, further comprising:
forming a flange of the hub shell with the fiber reinforced material.

19. The method of claim 18, wherein said forming the one or more spoke holes includes positioning the one or more spoke pins to extend completely through opposing sides of the flange.

20. The method of claim 18, wherein:
providing a countersink protrusion around at least one of the spoke pins; and
said molding the fiber reinforced material includes molding a counter sink section into the flange with the countersink protrusion.

21. The method of claim 17, further comprising:
creating an anti-rotation structure to inhibit rotation of the clutch adapter relative to the hub shell by folding plies of the fiber reinforced material to engage teeth of the clutch adapter.

22. The method of claim 21, wherein said creating the anti-rotation structure includes molding a first set of adapter engagement teeth configured to engage the clutch adapter.

23. The method of claim 22, wherein said creating the anti-rotation structure further includes molding a second set of adapter engagement teeth divided from the first set of adapter engagement teeth by a divider wall.

24. The method of claim 20, further comprising:
making the clutch adapter out of metal; and
wherein the fiber reinforced material is a carbon fiber material.

25. The method of claim 1, wherein said molding includes curing the fiber reinforced material by applying heat and pressure to a mold that includes the one or more spoke pins.

26. A method, comprising:
forming one or more spoke holes by bending one or more reinforcement fibers of a fiber reinforced material around one or more spoke pins where the reinforcement fibers remain continuous around the one or more spoke holes;
molding the fiber reinforced material into a shape of a hub shell with the one or more spoke holes; and
positioning one or more plies of the fiber reinforced material to form a clutch engagement structure that is integrally formed in the hub shell.

27. The method of claim 26, wherein said forming the spoke holes includes:
weaving one or more tows of the fiber reinforced material around the spoke pins; and
covering the one or more tows with an outer covering made of one or more plies of the fiber reinforced material.

28. The method of claim 26, further comprising:
forming a flange of the hub shell with the fiber reinforced material.

29. The method of claim 28, wherein said forming the one or more spoke holes includes positioning the one or more spoke pins to extend completely through opposing sides of the flange.

30. The method of claim 26, wherein said molding includes curing the fiber reinforced material by applying heat and pressure to a mold that includes the one or more spoke pins.

31. A method, comprising:
- forming one or more spoke holes by bending one or more reinforcement fibers of a fiber reinforced material around one or more spoke pins where the reinforcement fibers remain continuous around the one or more spoke holes;
- molding the fiber reinforced material into a shape of a hub shell with the one or more spoke holes; and
- forming a clutch engagement structure by molding a series of splines and grooves in the hub shell around an axle cavity.

32. The method of claim 31, wherein said forming the spoke holes includes:
- weaving one or more tows of the fiber reinforced material around the spoke pins; and
- covering the one or more tows with an outer covering made of one or more plies of the fiber reinforced material.

33. The method of claim 31, further comprising:
- forming a flange of the hub shell with the fiber reinforced material.

34. The method of claim 33, wherein said forming the one or more spoke holes includes positioning the one or more spoke pins to extend completely through opposing sides of the flange.

35. The method of claim 31, wherein said molding includes curing the fiber reinforced material by applying heat and pressure to a mold that includes the one or more spoke pins.

* * * * *